US009372711B2

(12) United States Patent
Galicia et al.

(10) Patent No.: US 9,372,711 B2
(45) Date of Patent: *Jun. 21, 2016

(54) SYSTEM AND METHOD FOR INITIATING A MULTI-ENVIRONMENT OPERATING SYSTEM

(75) Inventors: Joshua D. Galicia, Cary, IL (US); Jeffrey C. Carlyle, Grayslake, IL (US); Andrew N. Tzakis, Vernon Hills, IL (US)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 741 days.

This patent is subject to a terminal disclaimer.

(21) Appl. No.: 12/838,668

(22) Filed: Jul. 19, 2010

(65) Prior Publication Data
US 2011/0016301 A1    Jan. 20, 2011

Related U.S. Application Data

(60) Provisional application No. 61/226,974, filed on Jul. 20, 2009.

(51) Int. Cl.
| G06F 9/00 | (2006.01) |
| G06F 9/24 | (2006.01) |
| G06F 15/177 | (2006.01) |
| G06F 9/455 | (2006.01) |
| G06F 9/46 | (2006.01) |

(52) U.S. Cl.
CPC ............ *G06F 9/45537* (2013.01); *G06F 9/461* (2013.01)

(58) Field of Classification Search
CPC ........ G06F 9/00; G06F 9/461; G06F 9/45537
USPC ............... 713/1, 2, 100, 300, 320; 718/1, 100
See application file for complete search history.

(56) References Cited

U.S. PATENT DOCUMENTS

| 5,119,494 A | 6/1992 | Garman |
| 5,446,904 A | 8/1995 | Belt et al. |
| 5,592,657 A | 1/1997 | Johnson et al. |

(Continued)

FOREIGN PATENT DOCUMENTS

| CN | 101025701 A | 8/2007 |
| CN | 101051282 A | 10/2007 |

(Continued)

OTHER PUBLICATIONS

The Xen Team: "Users' manual Xen v2.0 for x86". University of Cambridge, UK, Dec. 31, 2004, 56 pages.*

(Continued)

*Primary Examiner* — Mark Connolly
(74) *Attorney, Agent, or Firm* — McDermott Will & Emery LLP

(57) ABSTRACT

Various embodiments of the present invention provide a mobile computing device that operates multiple, co-existing and independent operating system environments on a common kernel. A booting process for initiating a multiple operating system environment is also provided. Additionally, various embodiments of the present invention include processes for managing a switch between one operating system environment to a second operating system environment.

20 Claims, 12 Drawing Sheets

(56) References Cited

U.S. PATENT DOCUMENTS

| | | |
|---|---|---|
| 5,757,371 A | 5/1998 | Oran et al. |
| 5,828,376 A | 10/1998 | Solimene et al. |
| 6,043,816 A | 3/2000 | Williams et al. |
| 6,133,915 A | 10/2000 | Arcuri et al. |
| 6,167,425 A | 12/2000 | Beckhoff |
| 6,170,045 B1 | 1/2001 | Bobak et al. |
| 6,178,503 B1 | 1/2001 | Madden et al. |
| 6,205,452 B1 | 3/2001 | Warmus et al. |
| 6,215,490 B1 | 4/2001 | Kaply |
| 6,336,120 B1 * | 1/2002 | Noddings ......... G06F 17/30067 707/829 |
| 6,336,146 B1 | 1/2002 | Burridge et al. |
| 6,338,149 B1 | 1/2002 | Ciccone, Jr. et al. |
| 6,460,136 B1 * | 10/2002 | Krohmer et al. ............ 713/2 |
| 6,571,282 B1 | 5/2003 | Bowman-Amuah |
| 6,691,146 B1 | 2/2004 | Armstrong et al. |
| 6,710,788 B1 | 3/2004 | Freach et al. |
| 6,757,002 B1 | 6/2004 | Oross et al. |
| 6,763,458 B1 | 7/2004 | Watanabe et al. |
| 7,114,104 B1 | 9/2006 | Bennett |
| 7,328,333 B2 * | 2/2008 | Kawano et al. ............ 713/1 |
| 7,363,128 B2 | 4/2008 | Dietsch et al. |
| 7,424,601 B2 | 9/2008 | Xu |
| 7,424,623 B2 | 9/2008 | Du et al. |
| 7,461,144 B1 * | 12/2008 | Beloussov et al. ........... 709/223 |
| 7,468,729 B1 | 12/2008 | Levinson |
| 7,523,738 B2 | 4/2009 | Ruiz |
| 7,529,921 B2 * | 5/2009 | Stein et al. ........ 713/1 |
| 7,533,101 B2 | 5/2009 | Bond et al. |
| 7,536,537 B2 | 5/2009 | Linn |
| 7,590,945 B2 | 9/2009 | Sims et al. |
| 7,595,810 B2 | 9/2009 | Louch |
| 7,634,770 B2 | 12/2009 | Roth |
| 7,636,586 B2 | 12/2009 | Maaniitty |
| 7,681,134 B1 | 3/2010 | Grechishkin et al. |
| 7,689,820 B2 * | 3/2010 | Pierce et al. ........ 713/2 |
| 7,783,665 B1 * | 8/2010 | Tormasov et al. ........... 707/783 |
| 7,882,274 B2 | 2/2011 | Peterson |
| 7,975,236 B1 | 7/2011 | Grechishkin et al. |
| 8,046,570 B2 | 10/2011 | King et al. |
| 8,177,554 B2 | 5/2012 | Krasner |
| 8,195,624 B2 | 6/2012 | Yang |
| 8,261,231 B1 | 9/2012 | Hirsch et al. |
| 8,307,177 B2 | 11/2012 | Prahlad et al. |
| 8,352,733 B2 | 1/2013 | Mantere et al. |
| 8,392,498 B2 | 3/2013 | Berg et al. |
| 8,396,807 B1 | 3/2013 | Yemini et al. |
| 8,448,251 B2 | 5/2013 | Harris et al. |
| 8,589,952 B2 | 11/2013 | Wong et al. |
| 8,661,360 B2 | 2/2014 | Jeong et al. |
| 8,868,899 B2 | 10/2014 | Galicia et al. |
| 8,957,905 B2 | 2/2015 | Reeves et al. |
| 8,983,536 B2 | 3/2015 | Gangam et al. |
| 2001/0035882 A1 | 11/2001 | Stoakley et al. |
| 2002/0078260 A1 | 6/2002 | Hart et al. |
| 2002/0140742 A1 | 10/2002 | Lection et al. |
| 2002/0151334 A1 | 10/2002 | Sharma |
| 2002/0157001 A1 | 10/2002 | Huang |
| 2003/0065738 A1 | 4/2003 | Yang et al. |
| 2003/0135771 A1 * | 7/2003 | Cupps et al. ............ 713/320 |
| 2003/0204708 A1 | 10/2003 | Hulme et al. |
| 2003/0221087 A1 * | 11/2003 | Nagasaka .......... 712/209 |
| 2004/0015966 A1 | 1/2004 | MacChiano et al. |
| 2004/0039950 A1 | 2/2004 | Okamoto et al. |
| 2004/0061723 A1 | 4/2004 | Tai et al. |
| 2004/0066414 A1 | 4/2004 | Czerwinski et al. |
| 2004/0095388 A1 * | 5/2004 | Rocchetti et al. ............ 345/763 |
| 2004/0111644 A1 | 6/2004 | Saunders et al. |
| 2004/0148375 A1 | 7/2004 | Levett et al. |
| 2004/0205755 A1 | 10/2004 | Lescouet et al. |
| 2004/0207508 A1 | 10/2004 | Lin et al. |
| 2005/0086650 A1 | 4/2005 | Yates et al. |
| 2005/0108297 A1 | 5/2005 | Rollin et al. |
| 2005/0125739 A1 | 6/2005 | Thompson et al. |
| 2005/0229188 A1 | 10/2005 | Schneider |
| 2005/0240756 A1 | 10/2005 | Mayer |
| 2005/0240763 A9 | 10/2005 | Bhat et al. |
| 2005/0246505 A1 | 11/2005 | McKenney et al. |
| 2005/0268078 A1 | 12/2005 | Zimmer et al. |
| 2006/0005187 A1 | 1/2006 | Neil |
| 2006/0010314 A1 | 1/2006 | Xu |
| 2006/0010446 A1 | 1/2006 | Desai et al. |
| 2006/0026274 A1 | 2/2006 | Cho et al. |
| 2006/0046706 A1 | 3/2006 | Lin et al. |
| 2006/0146057 A1 | 7/2006 | Blythe |
| 2006/0224989 A1 | 10/2006 | Pettiross et al. |
| 2006/0225107 A1 | 10/2006 | Seetharaman et al. |
| 2006/0253706 A1 | 11/2006 | Roberts et al. |
| 2007/0050765 A1 * | 3/2007 | Geisinger .............. 718/1 |
| 2007/0128899 A1 | 6/2007 | Mayer |
| 2007/0135043 A1 | 6/2007 | Hayes et al. |
| 2007/0150842 A1 | 6/2007 | Chaudhri et al. |
| 2007/0162298 A1 | 7/2007 | Melton et al. |
| 2007/0180398 A1 | 8/2007 | McArdle |
| 2007/0192329 A1 | 8/2007 | Croft et al. |
| 2007/0198656 A1 | 8/2007 | Mazzaferri et al. |
| 2007/0226647 A1 | 9/2007 | Louch |
| 2007/0266231 A1 | 11/2007 | Chua |
| 2007/0283147 A1 * | 12/2007 | Fried et al. ............ 713/167 |
| 2007/0288941 A1 | 12/2007 | Dunshea et al. |
| 2007/0294689 A1 | 12/2007 | Garney |
| 2008/0028326 A1 | 1/2008 | Wilson et al. |
| 2008/0034318 A1 | 2/2008 | Louch et al. |
| 2008/0082815 A1 | 4/2008 | Kawano et al. |
| 2008/0100568 A1 | 5/2008 | Koch et al. |
| 2008/0114844 A1 | 5/2008 | Sanchez et al. |
| 2008/0162983 A1 | 7/2008 | Baba et al. |
| 2008/0256468 A1 | 10/2008 | Peters et al. |
| 2008/0270910 A1 | 10/2008 | Lukasik et al. |
| 2008/0276195 A1 | 11/2008 | Moromisato et al. |
| 2008/0282205 A1 | 11/2008 | Dykstra-Erickson et al. |
| 2008/0307350 A1 | 12/2008 | Sabatelli et al. |
| 2008/0307360 A1 | 12/2008 | Chaudhri et al. |
| 2009/0031329 A1 * | 1/2009 | Kim .................. 719/327 |
| 2009/0037909 A1 | 2/2009 | Xu |
| 2009/0063845 A1 * | 3/2009 | Lin .................... 713/100 |
| 2009/0064186 A1 | 3/2009 | Lin |
| 2009/0080562 A1 | 3/2009 | Franson |
| 2009/0089569 A1 * | 4/2009 | Baribault et al. .......... 713/2 |
| 2009/0158299 A1 | 6/2009 | Carter |
| 2009/0193074 A1 | 7/2009 | Lee |
| 2009/0199122 A1 | 8/2009 | Deutsch et al. |
| 2009/0199219 A1 | 8/2009 | Rofougaran et al. |
| 2009/0235200 A1 | 9/2009 | Deutsch et al. |
| 2009/0241072 A1 | 9/2009 | Chaudhri et al. |
| 2009/0276771 A1 | 11/2009 | Nickolov et al. |
| 2009/0287571 A1 | 11/2009 | Fujioka |
| 2009/0327917 A1 | 12/2009 | Aaron et al. |
| 2009/0328033 A1 | 12/2009 | Kohavi et al. |
| 2010/0064251 A1 | 3/2010 | Hufnagel et al. |
| 2010/0077347 A1 | 3/2010 | Kirtane et al. |
| 2010/0097386 A1 | 4/2010 | Kim et al. |
| 2010/0107115 A1 | 4/2010 | Sareen et al. |
| 2010/0138515 A1 | 6/2010 | Ruiz-Velasco et al. |
| 2010/0192149 A1 | 7/2010 | Lathrop et al. |
| 2010/0211769 A1 * | 8/2010 | Shankar et al. ............ 713/2 |
| 2010/0217912 A1 | 8/2010 | Rofougaran et al. |
| 2010/0245037 A1 | 9/2010 | Davis et al. |
| 2010/0313156 A1 | 12/2010 | Louch et al. |
| 2010/0313165 A1 | 12/2010 | Louch et al. |
| 2010/0319008 A1 | 12/2010 | Ho |
| 2010/0333088 A1 | 12/2010 | Rogel et al. |
| 2010/0333100 A1 | 12/2010 | Miyazaki et al. |
| 2011/0016299 A1 * | 1/2011 | Galicia et al. ............ 713/1 |
| 2011/0022993 A1 | 1/2011 | Ohno et al. |
| 2011/0054879 A1 | 3/2011 | Bogsanyl et al. |
| 2011/0055602 A1 | 3/2011 | Kamay et al. |
| 2011/0066984 A1 | 3/2011 | Li |
| 2011/0093691 A1 * | 4/2011 | Galicia et al. ............ 713/2 |
| 2011/0093836 A1 * | 4/2011 | Galicia et al. ............ 717/139 |
| 2011/0119610 A1 | 5/2011 | Hackborn et al. |
| 2011/0126216 A1 * | 5/2011 | Galicia et al. ............ 719/318 |
| 2011/0138295 A1 | 6/2011 | Momchilov et al. |
| 2011/0138314 A1 | 6/2011 | Mir et al. |

(56) References Cited

U.S. PATENT DOCUMENTS

| | | | |
|---|---|---|---|
| 2011/0144970 A1 | 6/2011 | Jiang et al. | |
| 2011/0179387 A1 | 7/2011 | Shaffer et al. | |
| 2011/0246786 A1 | 10/2011 | Laor et al. | |
| 2012/0036450 A1 | 2/2012 | Canton | |
| 2012/0041570 A1 | 2/2012 | Jones et al. | |
| 2012/0042159 A1* | 2/2012 | Liu | 713/2 |
| 2012/0081353 A1 | 4/2012 | Yusupov et al. | |
| 2012/0081380 A1 | 4/2012 | Reeves et al. | |
| 2012/0083264 A1 | 4/2012 | Ramasamy et al. | |
| 2012/0084542 A1* | 4/2012 | Reeves et al. | 713/1 |
| 2012/0084791 A1* | 4/2012 | Benedek et al. | 719/313 |
| 2012/0102495 A1* | 4/2012 | Gangam et al. | 718/102 |
| 2012/0150970 A1 | 6/2012 | Peterson et al. | |
| 2012/0151372 A1 | 6/2012 | Kominac et al. | |
| 2012/0173741 A1 | 7/2012 | Brittain et al. | |
| 2012/0173986 A1 | 7/2012 | Jung | |
| 2012/0174021 A1 | 7/2012 | Dharawat | |
| 2012/0192100 A1 | 7/2012 | Wang et al. | |
| 2012/0227058 A1 | 9/2012 | Hunt et al. | |
| 2012/0278747 A1 | 11/2012 | Abraham et al. | |
| 2012/0278750 A1 | 11/2012 | Abraham et al. | |
| 2012/0304092 A1 | 11/2012 | Jarrett et al. | |
| 2013/0160013 A1 | 6/2013 | Pires et al. | |
| 2013/0212283 A1 | 8/2013 | Wang et al. | |
| 2013/0293573 A1 | 11/2013 | Wolfe et al. | |
| 2013/0298140 A1 | 11/2013 | Wolfe et al. | |
| 2013/0298141 A1 | 11/2013 | Wolfe et al. | |
| 2013/0311682 A1 | 11/2013 | Barat et al. | |

FOREIGN PATENT DOCUMENTS

| | | |
|---|---|---|
| CN | 101149685 A | 3/2008 |
| CN | 101203842 A | 6/2008 |
| CN | 101382833 A | 3/2009 |
| CN | 101615123 A | 12/2009 |
| CN | 101697181 A | 4/2010 |
| EP | 157783 A1 | 10/1985 |
| EP | 1059582 A2 | 12/2000 |
| EP | 1688816 A1 | 8/2006 |
| GB | 2369959 A | 6/2002 |
| JP | H07-121336 A | 5/1995 |
| JP | 2005-242445 A | 9/2005 |
| JP | 2007-034600 A | 2/2007 |
| JP | 2009-157802 A | 7/2009 |
| RU | 2005136419 A | 5/2007 |
| RU | 2331160 C2 | 8/2008 |
| WO | WO-03/027876 A1 | 4/2003 |
| WO | WO-2005/043862 A1 | 5/2005 |
| WO | WO-2007/035611 A2 | 3/2007 |
| WO | WO-2010/148306 A1 | 12/2010 |
| WO | WO-2011/060382 A1 | 5/2011 |
| WO | WO-2012/012865 A1 | 2/2012 |
| WO | WO-2012/148881 A1 | 11/2012 |
| WO | WO-2012/148885 A1 | 11/2012 |

OTHER PUBLICATIONS

Casadevall et al., AndroidExecutionEnvironment, https://wiki.ubuntu.com/Specs/AndroidExecutionEnvironment, Apr. 28, 2009.*
Kernel (computing) from Wikipedia; http://en.wikipedia.org/wiki/Kernal_(computer_science); 18 pages, printed Jun. 5, 2009.
Ubuntu from Wikipedia; http://en.wikipedia.org/wiki/ubuntu; 12 pages, printed Jun. 5, 2009.
Ubuntu Mobile; http://en.wikipedia.org/wiki/ubuntu_mobile; 2 pages, printed Jun. 5, 2009.
U.S. Appl. No. 12/839,069, filed Jul. 19, 2010, "System and Method for Switching Between Environments in a Multi-Environment Operating System"; 29 pages.
U.S. Appl. No. 12/838,868, filed Jul. 19, 2010, "Multi-Environment Operating System", 28 pages.
U.S. Appl. No. 12/838,984, filed Jul. 19, 2010, "Multi-Environment Operating System", 43 pages.
U.S. Appl. No. 12/839,193, filed Jul. 19, 2010, "Multi-Environment Operating System", 48 pages.
An Overview of Virtulization Techniques, Jun. 4, 2009, www.virtuatopia.com/index.pjp/AnOverview_of_Virtualization_Techniques, 4 pages.
Baentsch, "Mote Runner: A Multi-Language Virtual Machine for Small Embedded Devices," Jun. 2009, 3rd International Conference on Sensor Technologies and Applications, IEEE, 10 pages.
Hassan, "Ubiquitous Computing and Android" 3rd International Conference Digital Information Management, Dec. 2008, IEEE, 6 pages.
Turner, "Introducing Android 1.5 NDK, Release 1", Jun. 25, 2009, 4 pages.
Android Central Forums: Getting Started with Android—Tips and Tricks, http://forums.androidcentral.com/general-help-how/31622-getting-started-android-tips-tricks.html, Sep. 2010, excerpted 41 pages.
The Sun BabelFish Blog, "why Apple Spaces is Broken," Nov. 2007, blogs.oracle.com/bblfish/entry/why_apple_spaces_is_broken, 24 pages.
Citrix: Go ToAssist Corporate Remote Support Made Easy, www.gotoassist.com, Fact Sheet, 10.8.10/B-27141/PDF, 2010, Citrix Online LLC.
Citrix: Go ToAssist Corporate Remote Support Made Easy, www.gotoassist.com, Product Overview, 4.21.10/B-26651/PDF, 2010, Citrix Online LLC.
Citrix: Go ToAssist Express Remote Support Made Easy, www.gotoassist.com, Fact Sheet, 9.27.10/B-21307/PDF, 2010, Citrix Online LLC.
Dormon: Motorola Atrix Lapdock, http://www.theregister.co.uk/Print/2011/08/19/accessory_of_the_week_motorola_atrix_lapdock, Aug. 2011, 8 pages.
D'Sa, "Run Android apps on Windows," Nov. 2011, http://tech2.in.com/how-to/apps/run-android-apps-on-windows/259042.
EGL 1.0 Specification, published Jul. 23, 2003.
Getting Started with VMware Fusion for Mac OS X, VMware, item EN-000189-00, copyright 2007-2009, VMware, Inc.
Herrman: VMWare for Mobile Devices Lets yuou Run Windows and Android Simultaneously, http://gizmodo.com/5160685/vmware-for-mobile-devices-lets-you-run-windows-and-android-simultaneously/all, Feb. 2009, 2 pages.
Kobie, "Vmware demos mobile virtualisation," Feb. 2009, http://itpro.co.uk/609992/vmware-demos-mobile-virtualisation.
Martin: iTunes 9.0.2 Improves App Sorting, http://reviews.cnet.com/8301-19512_7-10387022-233.html?tag=contentMain;contentBody;1n, Oct. 2009, 5 pages.
Nakajima, et al., "Composition Kernel: A multicore Processor Virtualization Layer for Rich Functional Smart Products," Software Technologies for Embedded and Ubiquitous Systems, Oct. 2010, pp. 227-238.
Parallels: Parallels Workstation, http://www.parallels.com/products/workstation/, downloaded Dec. 28, 2012.
Paul, "Canonical developers aim to make Android apps run on Ubuntu," May 2009, http://arstechnica.com/gadgets/2009/05-canonical-developerss-aim-to-make-android-apps-run-on-ubuntu/.
Payne, et al. "Lares: An Architecture for Secure Active Monitoring Using Virtualization," IEEE Symposium on Security and Privacy, May 2008, pp. 233-247.
Payne, et al. "Secure and Flexible Monitoring of Virtual Machines," Computer Security Applications Conference, Dec. 2007, pp. 385-397.
Ramananthan: Ubuntu for Android: The Complete Story, http://www.muktware.com/2012/02/ubuntu-for-andriod-the-complete-story/2553, Feb. 2012, 5 pages.
Richardson, et al., "Virtual Network Computing," IEEE Internet Computing, IEEE Service Center, Jan. 1998, vol. 2, No. 1, pp. 33-38.
Tubbs, "Windows Live Mesh 2011 and SkyDrive Synced Storage woven together nicely; still a few loose threads," posted Oct. 29, 2010, http://www.wysiwygmedia.com/reviews/windows-live-mesh-2011-and-skydrive-synced-storage-woven-together-nicely-still-a-few-loose-threads.wm.
"Ubuntu Linux Rocks!!" published Nov. 15, 2009, http://maxtheitpro.com/ubuntu-linux-rocks.
Vmware: VMware Workstation 7 Product FAQs, downloaded Apr. 18, 2011.

(56) References Cited

OTHER PUBLICATIONS

VMware Workstation 7, The Gold Standard in Desktop Virtualization, Product Datasheet, 2009, www.vmware.com.
Whitwam: Everything You Need to Know about Ubunto for Android; http://www.tested.com/tech/android/3627-everything-you-need-to-know-about-ubuntu-for-android/, Feb. 2012, 5 pages.
Windows Live Mesh, Windows Live, 2011, Microsoft.
Codecoffee, "How to compile & execute C programs under Linux (Absolute basics)," Oct. 2009, retrieved from http://www.codecoffee.com/tipsforlinux/articles/18.html.
Maker, "A Survey on Android vs Linux," University of California 2009, pp. 1-10.
Meier "Professional Android 2 Application Development," Aug. 2010, retrieved from http://esys.ir/files/ref_books/android/esys.ir_professional%20android%202%20application%20development.pdf.
Wikipedia "Comparison of X Window System desktop environment," Jan. 2009, retrieved from http://en.wikipedia.org/wiki/Comparison_of_X_Window_System_desktop_environments.
Wikipedia "GNU C Library," Nov. 2009, retrieved from http://en.wikipedia.org/wiki/GNU_C_Library 4 pages.
Wikipedia "POSIX," Apr. 2009, retrieved from http://en.wikipedia.org/wiki/POSIX, 5 pages.
Wikipedia "Taskbar" retrieved from http://en.wikipedia.org/wiki/Taskbar dated Feb. 24, 2010; 7 pages.
Wikipedia "X Window System," Jan. 2009, retrieved from http://en.wikipedia.org/wiki/X_window_system, 11 pages.
Gelchlik, "How to Lock Your Computer with Bluetooth Proximity Lock Utility," Apr. 2010, http://www.makeuseof.com/tag/lock-windows-computer-bluetooth-proximity-lock-utility/.
Mac OS X Hints, "Lock and unlock a Mac using Bluetooth detection," Dec. 2009, http://hints.macworld.com/article.php?story=20091221173111783.
Ubuntu forums, "Howto: Use BlueProximity and your cellphone for security," Feb. 2008, http://ubuntuforums.org/showthread.php?t=702372.
Webtop Application, archived Apr. 29, 2011, 6 pages, retrieved from https://web.archive.org/web/20110429011220/http://www.motorola.com/support/us-en/consumer-support/software/webtop_application.

\* cited by examiner

SYSTEM AND METHOD FOR INITIATING A MULTI-ENVIRONMENT OPERATING SYSTEM

CROSS-REFERENCE TO RELATED APPLICATIONS

This application claims the benefit of U.S. Provisional Patent Application No. 61/226,974, titled "System and Method for Initiating a Multi-Environment Operating System" and filed on Jul. 20, 2009.

FIELD OF THE INVENTION

The present invention relates generally to operating systems and methods for initiating an operating system boot sequence. More specifically the present invention relates to multi-environment operating systems and methods for booting multi-environment operating systems.

BACKGROUND OF THE INVENTION

Operating systems are designed and typically optimized based on specific applications and user desired performance. It is often desirable to have features of one type of operating system available to another operating system, as user preferred programs can be operating system dependant.

General-purpose computer operating systems such as Linux™ and Windows™ have an extensive set of features such as file systems, device drivers, applications, libraries, etc. Such operating systems allow concurrent execution of multiple programs, and attempt to optimize the response time (also referred to as latency time), and CPU usage, or load, associated to the servicing of the concurrently executing programs. Unfortunately, however, such operating systems are not generally suitable for embedded real-time applications, such as for mobile computing devices. Under certain circumstances it would be desirable for a mobile computing device to have the performance associated with a mobile-specific embedded operating system and features of a general-purpose operating system.

Linux, for example, is a well known general purpose desktop operating system with many desirable features for modem devices including modern operating systems features, numerous development tools, networking, etc. However, Linux was not designed to be an embedded or real time operating system. Many modern devices, such as, without limitation, set top boxes, mobile phones and car navigation systems require not only the features of a general purpose operating system such as Linux, but also the features of an embedded or real time operating system, including real time performance.

Historically, running multiple operating environments on a single device has been accomplished through virtualization techniques, such as, by example, VMware™, VirtualBox™, QEMU™, etc. However, when using virtualization a complete computer is emulated and one or more software stacks are operated in the emulated computing device. Emulation is wrought with high overhead costs.

In view of the foregoing, there is a need for a system implementing a single-kernel environment that efficiently and conveniently provides the performance and features of co-existing, independent operating systems.

BRIEF SUMMARY OF THE INVENTION

In accordance with at least one embodiment of the present invention, a method for booting a device having at least two co-existing independent operating environments is provided. The method includes initiating a start-up boot sequence, initializing a core kernel, identifying a device mode state, launching services common to a first operating system and a second operating system, selecting a primary operating system based at least in part upon the mode state and launching initializing scripts of the primary operating system; and launching initializing scripts of a secondary operating system.

In an alternative embodiment, a method for operating a device having multiple co-existing operating environments is provided. The method includes initiating a boot sequence configured to simultaneously launch two operating system environments, identifying the mode state of the device and selecting a primary operating environment based at least in part upon the mode state.

In yet another embodiment of the present invention, a mobile device operating system having a core kernel configured to interface a device hardware component and a middleware component is provided. The system includes at least two co-existing independent middleware operating environments coupled to the core kernel, the middleware operating environments each having a corresponding application component.

According to another embodiment of the invention, a mobile computing device having a memory storage unit coupled to a computer processor is provided. The memory storage unit includes computer executable instructions capable of operating at least two operating system environments on a common kernel According to yet another alternative embodiment, a mobile telephone having a graphical user interface configured to receive and transmit multimedia information is provided. The telephone includes a computing system with a processor coupled to a memory storage unit, and a multi-environment operating system having a common kernel. The memory storage unit includes computer executable instructions capable of managing resources shared between at least two co-existing independent operating system environments.

In accordance with an alternative embodiment, the present invention includes a mobile computing device with a computer processor coupled to a computer memory having computer executable instructions configured to initiate an operating system. The device also includes an operating system configured to simultaneously run a standard Linux distribution operating system environment and an Android™ operating system environment on a single kernel.

According to yet another alternative embodiment, the invention includes a mobile device operating system having a core kernel configured to interface a device hardware component and a middleware component. The device also includes a first independent middleware operating environment configured to run JAVA-interpreted applications and coupled to the core kernel, and a second independent middleware operating environment configured to run native applications and coupled to the core kernel.

DETAILED DESCRIPTION

It is envisioned that it would be advantageous to have an embedded operating system and a Linux-based operating environment communicate directly with a single Linux kernel running directly upon a computing device's hardware.

Figure 1:
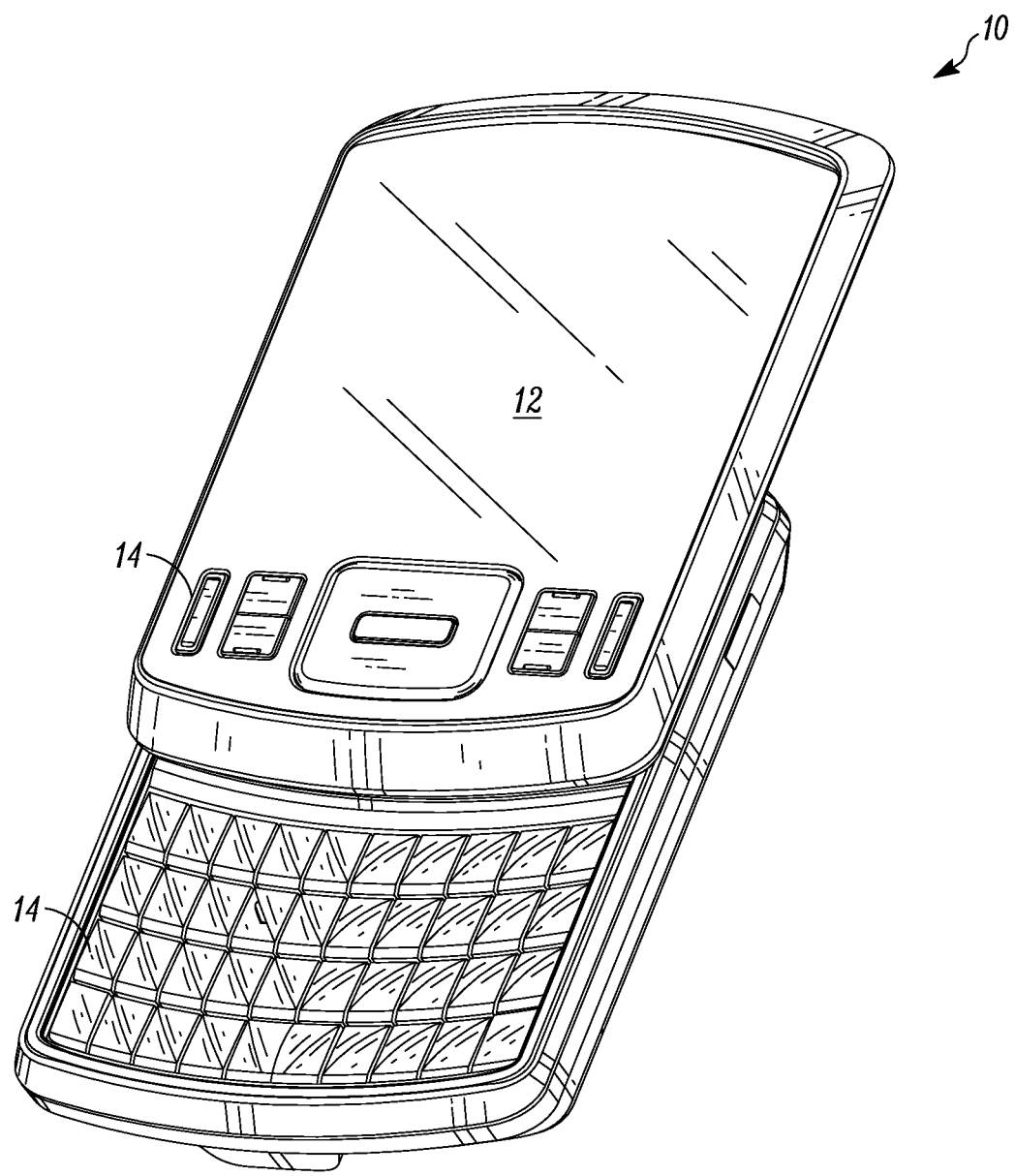
FIG. 1 is an exemplary perspective view of a mobile device.

Referring to FIG. 1, a mobile telephone 10 is provided. The telephone 10 includes a GUI 12 and a plurality of data input buttons 14. The mobile device 10 is selected from the group including, but not limited to, a mobile personal computer (PC), a netbook, a mobile telephone, a laptop computer, a handheld computer and a smart phone. Although the device 10 is mobile, it is intended to have significant computing power, with a processor speed in excess of 500 mHz, although slower processors are not excluded. Considering the computing power, a user can connect the device 10 to a variety of peripheral devices (not shown). The peripheral devices are selected from a group including, but not limited to, computer monitor, a laptop computer, a desktop computer, a tablet PC, and a screen projector.

Figure 2:
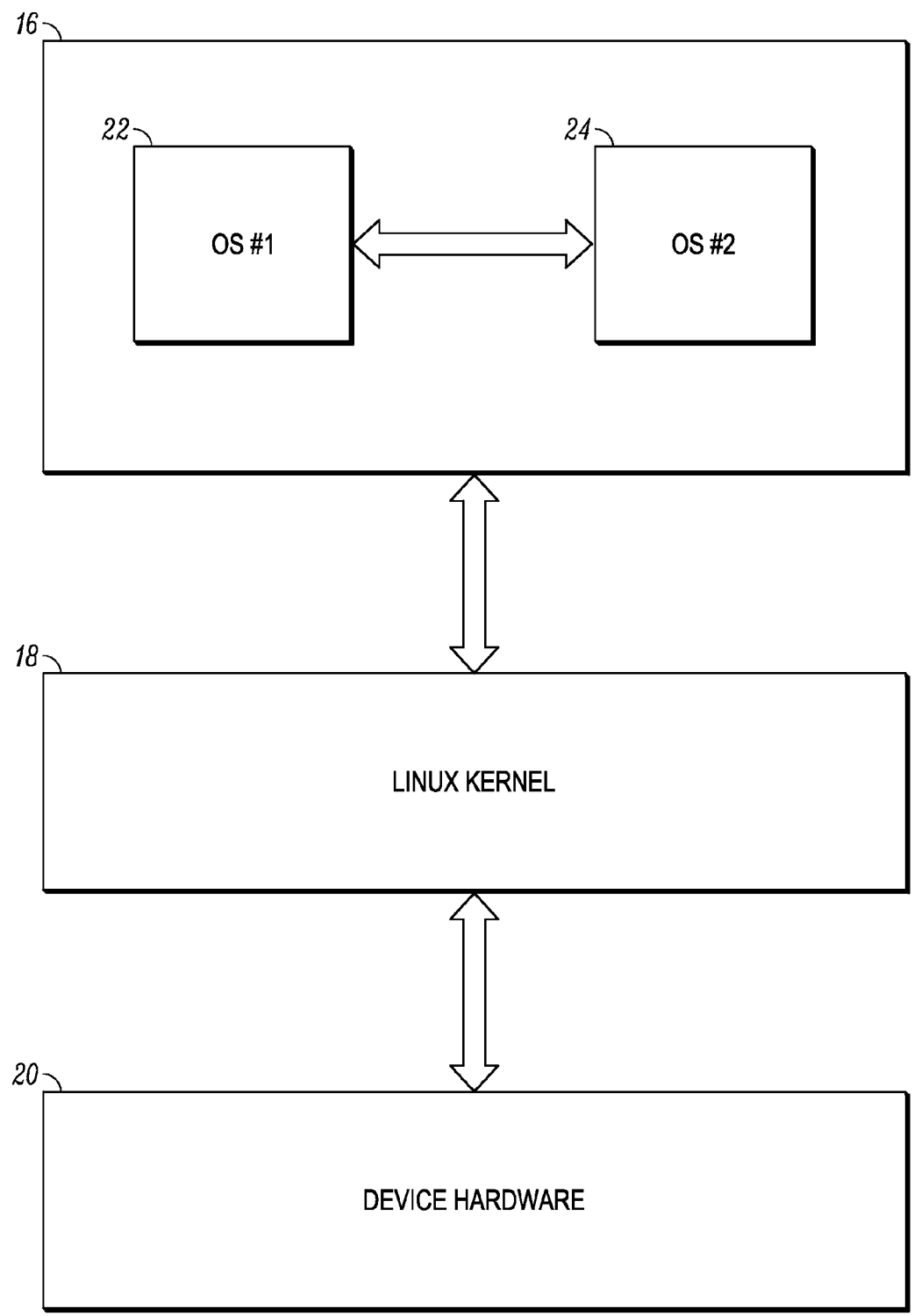
FIG. 2 is a block diagram representing an exemplary operating system.

Now referring to FIG. 2, a block diagram of an exemplary operating system (OS) 16 in communication with a kernel 18 is provided. The OS 16 can be a Linux distribution system, a Linux-based operating system or a non-Linux-based operating system. The device hardware 20 is also in communication with the Linux kernel 18. The operating system 16 includes a first operating system environment 22 and a second operating system environment 24 in communication with a single Linux kernel 18. By example, the second middleware operating system environment 24 is a standard Linux distribution and the first middleware operating system environment 22 is an embedded operating system environment intended for use in mobile devices, such as an Android™ (Open Handset Alliance, www.openhandsetalliance.com) operating system. A Linux distribution 16 is in communication with the Linux kernel 18, which is in communication with the device hardware 20. The device hardware 20 can be a memory storage device (not shown) coupled to a processor (not shown) which stores computer executable instructions which are configured to perform various functions and operations, as described herein.

An exemplary operating system 16 includes Ubuntu® (Canonical Ltd., www.ubuntu.com) for the Linux-based operating system environment 24. It is specifically intended that multiple middleware operating system environments co-exist independent of the other(s). Exemplary environments that can be included in operating system 16 include Android™, Ubuntu® (Canonical Ltd., www.ubuntu.com), standard Linux-based environments, Symbian (Symbian Foundation Ltd., www.symbian.com), and Windows-based environments. In an alternative embodiment, it is envisioned that greater than two operating system environments are configured to independently co-exist on the same core kernel 18.

Figure 3:
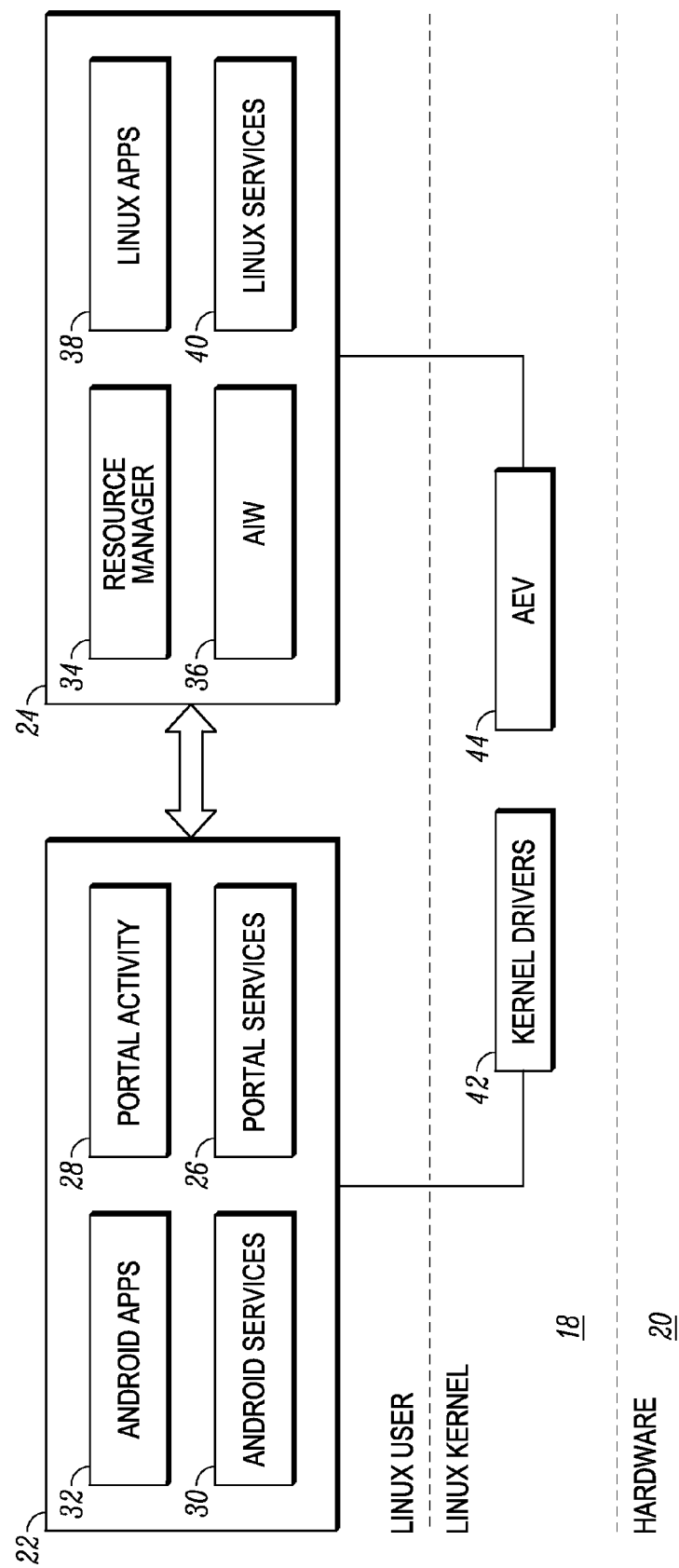
FIG. 3 is a block diagram of an exemplary operating system.

Referring to FIG. 3, a block diagram of an exemplary operating system is provided. In the present exemplary embodiment, the first OS environment 22 is an Android™ based operating environment and the second OS environment 24 is Linux-based. The first operating system environment 22 includes a portal service module 26, a portal activity module 28, a OS services module 30 and an OS applications module 32. The second operating system environment 24 includes a resource manager 34, an Android in a window (AIW) module 36, a second OS applications module 38 and a second OS services module 40.

The AIW module 36 is configured to display a first OS 22 application window on the GUI 12 while the second OS 24 is the primary operating environment.

The portal service module 26 contains a set of instructions configured to allow service for the first OS 22 and directs all communication with the resource manager 34. While the device 10 is operating the portal service module 26 is preferably running at all times. Additionally, the portal service module 26 is connected to activity associated with the portal activity module 28, as well as first OS 22 broadcast events. The portal activity module 28 is an application, or set of computer executable instructions, which represents a second OS 24 application located on the first OS 22 stack. By example, if the second OS 24 is Ubuntu® the portal activity module 28 can represent a specific Ubuntu application, and when the portal activity module 28 has focus, Ubuntu is in view through the GUI 12. Numerous applications can run simultaneously, also referred to as a stack of running applications, within any given operating environment. Logically speaking, the topmost application is deemed to have "focus".

The kernel 18 includes a set of drivers 42 and an AEV module 44. Included with the drivers 42 are input device drivers for hardware components 20. The AEV 44 is a kernel module that takes absolute coordinate and keyboard events from AIW 36 and passes them to an event hub.

The co-existing environments within operating system 16 communicate with each other. The resource manager 34, which is part of the second OS 24, communicates directly with the portal service module 26, which is part of the first OS 22. Furthermore, the portal service module 26, which is part of the first OS 22, communicates directly with the resource manager 34. The resource manager 34 is a set of instructions configured to manage the resources shared by the first OS 22 and second OS 24. The shared resources include display devices, input devices, power management services and system state information. Furthermore, the resource manager 34 is configured to control OS 22,24 access to the hardware 20. Additionally, the resource manager 34 identifies and controls which OS 22,24 user interface is displayed through the GUI 12.

According to the present embodiment, the portal service 26 is the source of all communications from the first OS 22 to the resource manager 34. Additionally, the portal service 26 is a sink for all callbacks from the resource manager 34 to the first OS 22. The resource manager provides a status discoverable application programming interface (API) to the portal service 26. This API is configured to be called by the resource manager 34 at any time. The resource manager 34 is configured to obtain and process runtime status, which allows for the resource manager to maintain a state machine. For the first OS 22, the portal service 26 provides runtime status to processes that require them. Similarly, the portal service 26 requests and receives status updates from processes which provide status information. A similar communication for the second OS 24 is controlled by the resource manager 34, which provides runtime status to the processes that require them. Resource manager 34 requests and receives status updates from various processes that provide status information. Device drivers 42 logically associated with the kernel 18 communicate directly with the resource manager 34 as well as the processes that provide runtime status information. By example, the API arbitrates access to user interface devices, such as displays, touch screens or the GUI 12. Yet another example, the API arbitrates access to power input devices, such as batteries and/or AC/DC wall plugs.

The first OS 22 and the second OS 24 are independent from the other, and co-exist with respect to the other. Each OS 22, 24 is a fully functioning operating system environment, and does not need the other operating system environment to function. The two operating system environments exist on the same device 10 with 100% independence with respect to the other. As identified above, the first and second OS 22, 24 do not co-exist in a virtualization or emulation scheme, but in fact operate on a single kernel 18. Instead, there is runtime co-existence in which both OS 22,24 run in their respective native environments and neither OS 22,24 is recompiled, as there is no need to leverage a common C runtime environment. Applications can be accessed by a user which are coded purely for one or the other OS 22, 24 without an interruption to a user's computing experience.

Figure 4:
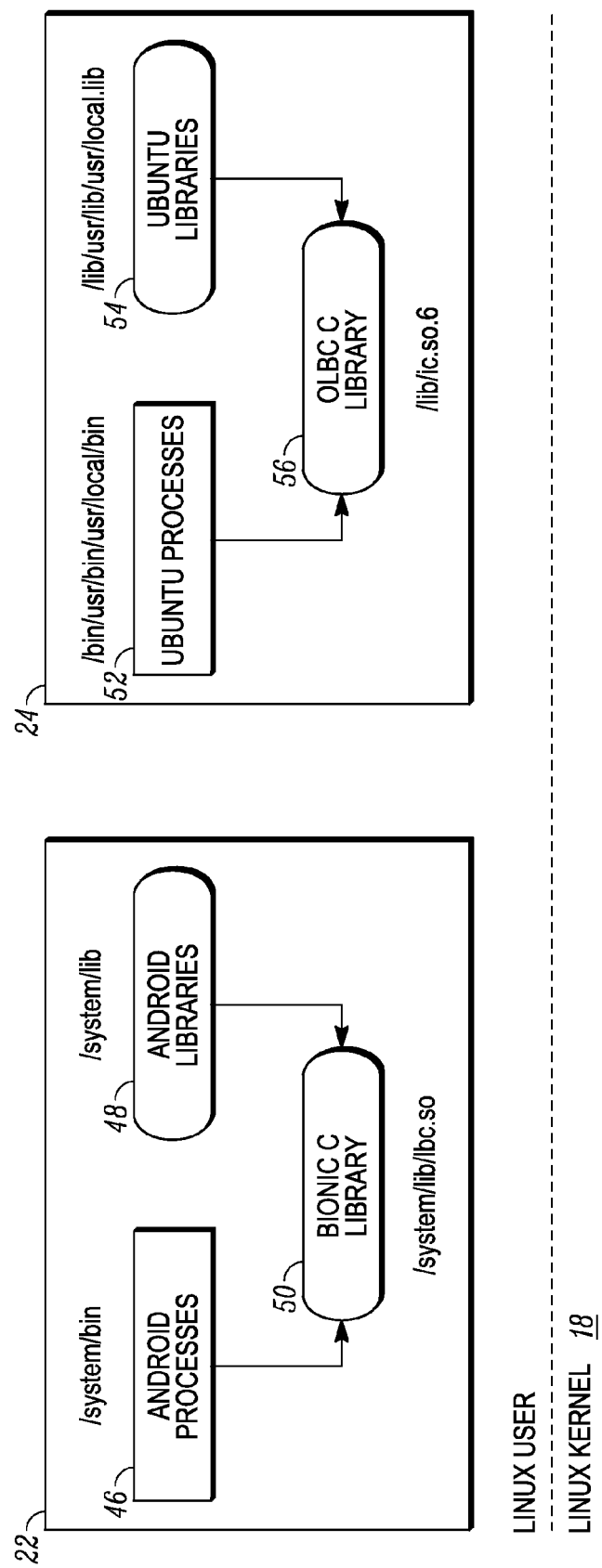
FIG. 4 is a block diagram of a runtime co-existence schema of an exemplary operating system.

Referring to FIG. 4, a block diagram provides an exemplary co-existence scheme for an Android® OS 22 and an Ubuntu™ OS 24. Each OS 22,24 operates on a separate runtime environment, which provides software services for programs and/or processes while the device 10 is operating. Android processes 46 and Android libraries 48 access a Bionic C Library 50, which is optimized and modified specifically for the Android environment. Ubuntu processes 52 and Ubuntu libraries 54 access a Glibc C Library 56, which is a GNU C library used in many standard desktop Linux-based systems. Each OS environment runs on its respective C libraries without conflicting another operating environment.

Figure 5:
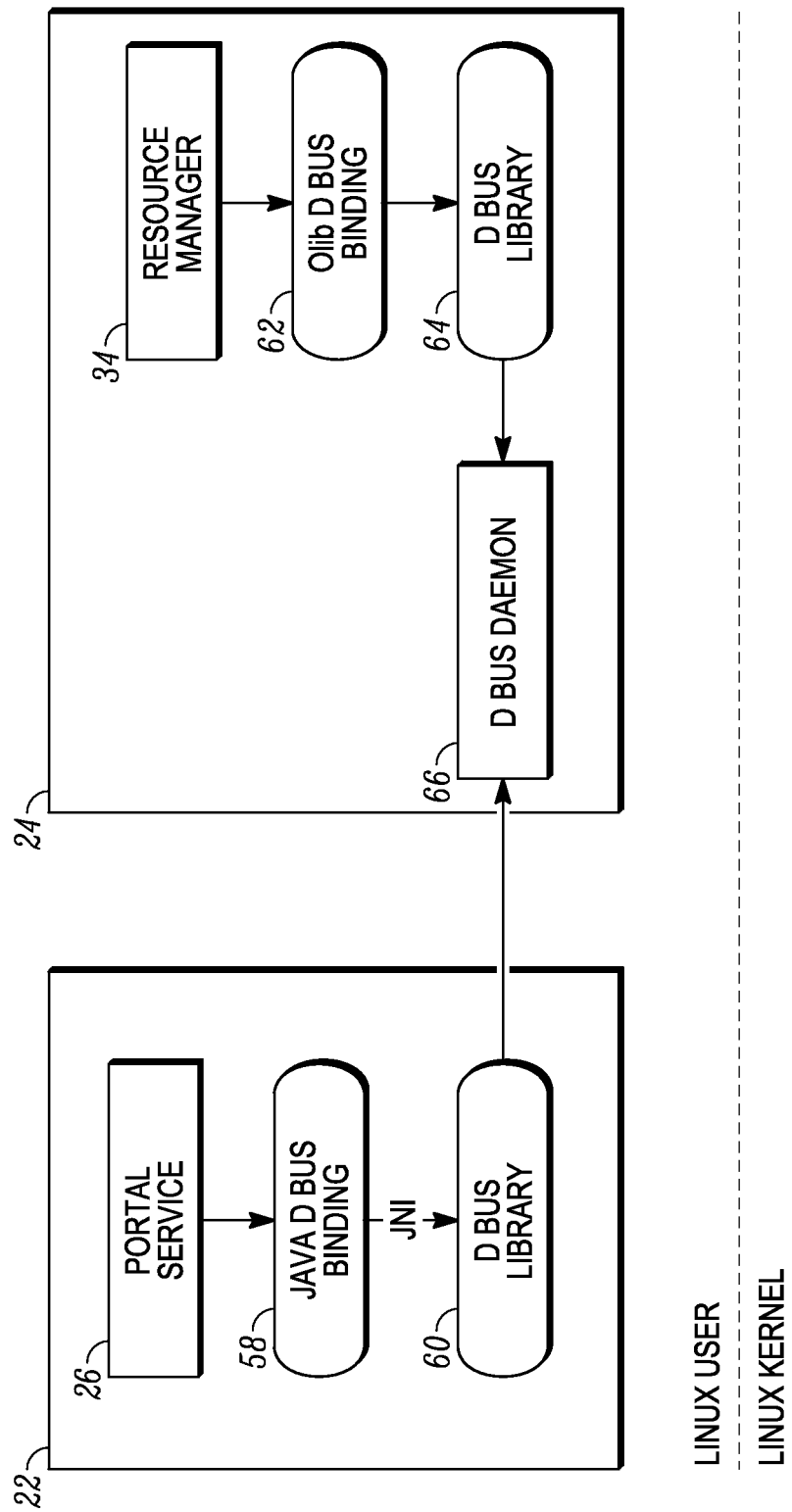
FIG. 5 is block diagram of a inter-environment communication schema of an exemplary operating system.

Referring to FIG. 5, a more detailed communication path between the first OS 22 and the second OS 24 described in FIG. 4 is provided. An inter-process communication (IPC) system is configured to manage the inter-environment communication flow between the first OS 22 and the second OS 24. The portal service 26 communicates with a DBUS Binding 58, which is a software package containing programming language and executable instructions configured to communicate with a DBUS library 60. The resource manager 34 communicates with a Glib DBUS binding 62, which also is a software package containing programming language and executable instructions configured to communicate with a DBUS library 64 configured for the second OS 24. Both the first OS 22 DBUS library 60 and the second OS 24 library 64 communicate through a DBUS Daemon 66, which is logically part of the second OS 24, and acts as the communication link between the two operating environments.

Figure 6:
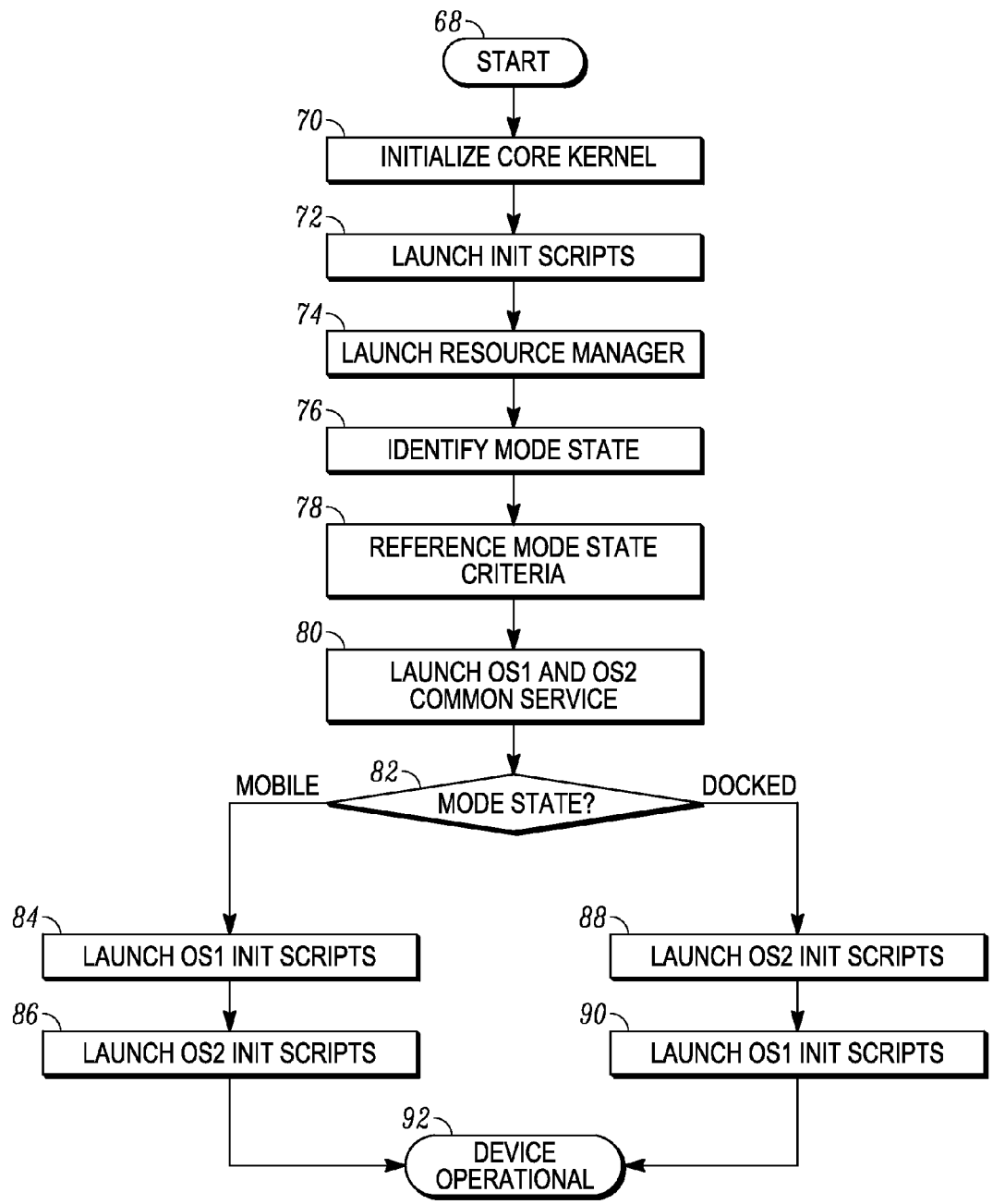
FIG. 6 is a flow chart identifying steps in a booting sequence for an exemplary operating system.

Referring to FIG. 6, a flow chart representing a boot sequence is provided. The boot sequence includes both common and operating system environment-specific steps. The actual boot sequence is dependent upon rules associated with a predetermined device state that dictates the booting sequence. By example, if the device is connected to a peripheral device, such as a monitor, the device state is considered to be in docked mode, and the second OS 24 is the default primary environment. Alternatively, if the device 10 is not connected to a peripheral device, then it is in mobile mode, and the first OS 22 is the default primary operating environment. However, the secondary operating environment is launched simultaneously with the primary environment, and operates in the background in case the device 10 state changes and the secondary environment is switched to become the primary environment. By example, when the device 10 is in docked mode and the peripheral device is unplugged, there is an automatic switch to mobile mode, which results in the secondary environment becoming the primary environment, and vice versa.

The boot sequence is initiated at step 68, followed by launching the core Linux kernel 18 at step 70. A bootloader program initializes prior to launching the kernel. After the Linux kernel 18 is initialized, the kernel launches user space scripts at step 72. The resource manager 34 is launched at step 74, followed by identifying the mode state at step 76. Once the mode state is identified a reference library is accessed at step 78 to determine the criteria associated with and/or dictated by the mode state that is identified. At step 80, the services common to both the first OS 22 and the second OS 24 are launched. The mode state determined at step 76 is referenced at step 82. If the mobile state is identified then the first OS 22 is the primary operating environment, then the first OS initialization scripts are launched at step 84, followed by the second OS initialization scripts launched at step 86. If the docked state is referenced at step 82, then the second OS 24 is the primary operating environment, and then the second OS 24 initialization scripts are launched at step 88 followed by launching the first OS 22 initialization scripts at step 90. Regardless of which environment is the primary, both environments are launched and running before the device 10 is operational at step 92. Since the common services are launched first at step 80, for all intents and purposes the primary and secondary environments are launched in parallel. However, the primary environment-specific services, based upon the device state, are launched immediately before the secondary environment-specific services. By separating the common services launch with the environment-specific launch, the device 10 can be quickly operational with multiple co-existing and independent operating environments.

Figure 7:
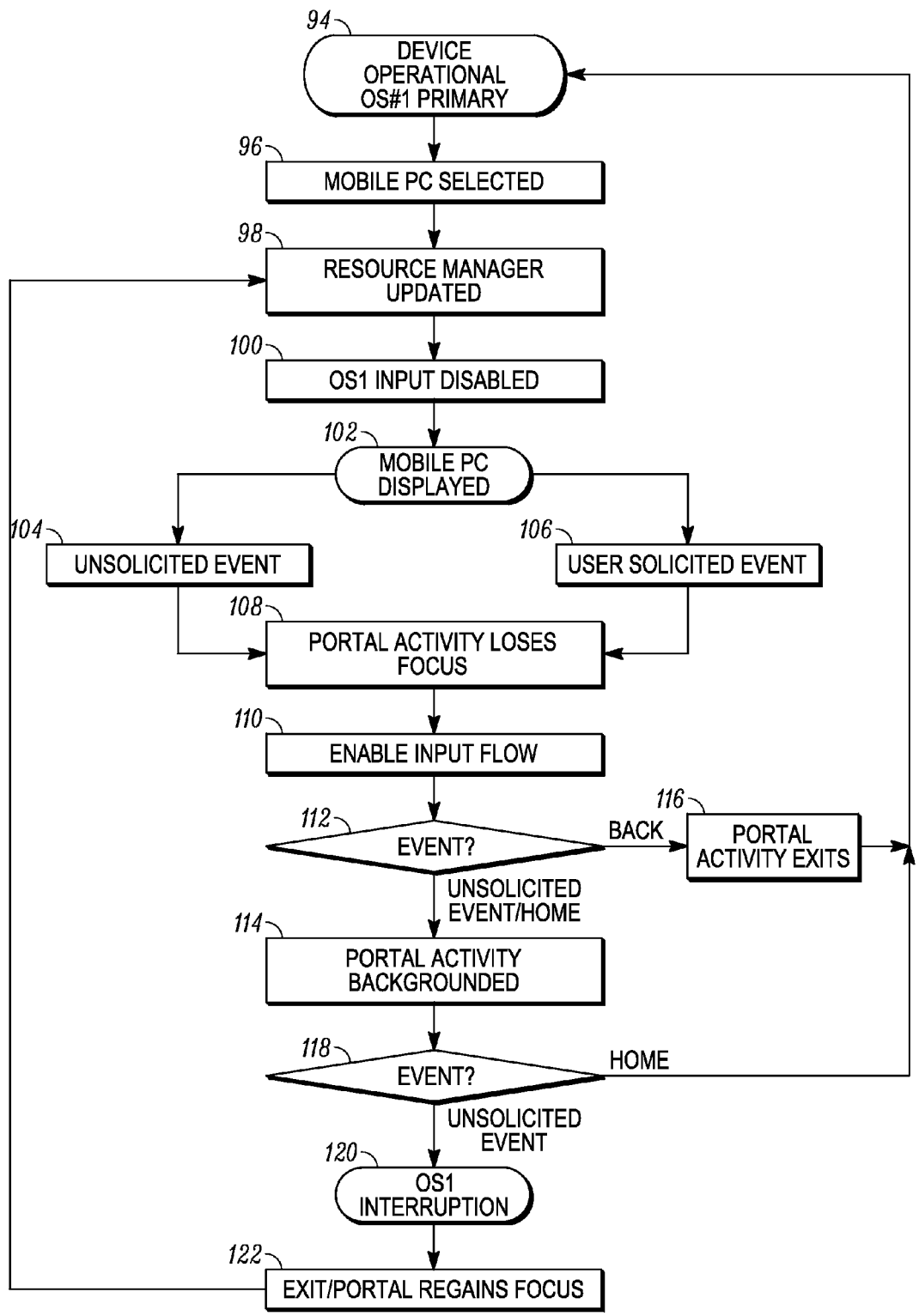
FIG. 7 is a flow chart identifying exemplary steps for launching an application in a first operating environment while an exemplary operating system is controlled by a second operating environment.

Referring to FIG. 7, a flow chart identifying steps for launching a second OS 24 application while the device 10 is in mobile mode 94 and the first OS 22 has primary control. A second OS 24 application, Mobile PC, is selected at step 96. Mobile PC is an application in the first OS 22 which provides a full PC view, alternatively referred to as a netbook view, while the device 10 is operating in mobile mode and the first OS 22 is in primary control. In an alternative embodiment, individual applications from the second OS 24 can be listed in a first OS 22 menu and individually launched, which can be similar to a netbook view.

The portal service 26 sends a status update communication to the resource manager 34 at step 98 indicating that the portal activity 28 has gained focus. Thereafter, the resource manager 34 disables the first OS 22 input and switches a virtual terminal at step 100. The mobile PC application is displayed on the GUI 12 at step 102. While operating the mobile PC application an unsolicited event can occur at step 104 or a user-solicited event can occur at step 106. Unsolicited events include time critical and non-time critical events. By example, a time critical unsolicited event includes a phone call or a scheduled or unscheduled alarm. Furthermore, by example, a non-time critical unsolicited event includes a SMS message, an email message or a device update notification. After an event 104,106 occurs the portal service 26 sends a communication to the resource manager 34 indicating that the portal activity 28 has lost focus at step 108. At step 110, the resource manager 34 requests the first OS 22 to enable input event flow and switches the virtual terminal. By example, the present embodiment includes separate virtual terminals for switching display control between the first OS 22 and the second OS 24. Broadly speaking, a virtual terminal is a Linux application that allows a system user to switch display controls between Windows based view and a system console.

When an unsolicited event occurs or a user selects the "Home" key at step 112, the portal activity 28 is switched to the background at step 114 while the unsolicited event continues or the user operates another application from the "Home" menu of the GUI 12. Alternatively, if the user selects the "Back" key at step 112, then the portal activity 28 exits the application and the device 10 reverts to the idle main menu at step 94. User-initiated events, such as selecting the Home key, Back key, or initiating a new application are exemplary solicited events. When an event occurs a decision is made at step 118, and the first OS 22 is interrupted at step 120 if the event is an unsolicited event. Alternatively, if the event is a solicited event, such as the user selecting the "Home" key, then the device reverts to the idle main menu at step 94. After the OS interruption at step 120, the interrupting application exits and the portal activity 28 regains focus at step 122 and the device 10 reverts to step 98.

In an alternative embodiment, the virtual terminal facility is not utilized. Rendering a second OS 24 application while in the mobile mode can be accomplished through a VNC-like application. The second OS 24 application, such as Ubuntu, can be rendered remotely into the VNC client. Additionally, this embodiment doesn't take physical display control away from the first OS 22.

In yet another alternative embodiment, non time-critical notifications generated by the first OS 22 are identified and listed in a panel within the second OS 24 view. By listing the notifications in a panel the first OS 22 status information is integrated with the second OS 24 view when the second OS 24 is the primary OS. At the user's leisure, the panel is accessed to reveal non time-critical status notifications. When the panel is engaged the first OS 22 becomes the primary OS and allows the notifications to be viewed. By example, the panel can be a pull-down list that comes down from a status area with a slide gesture.

Figure 8:
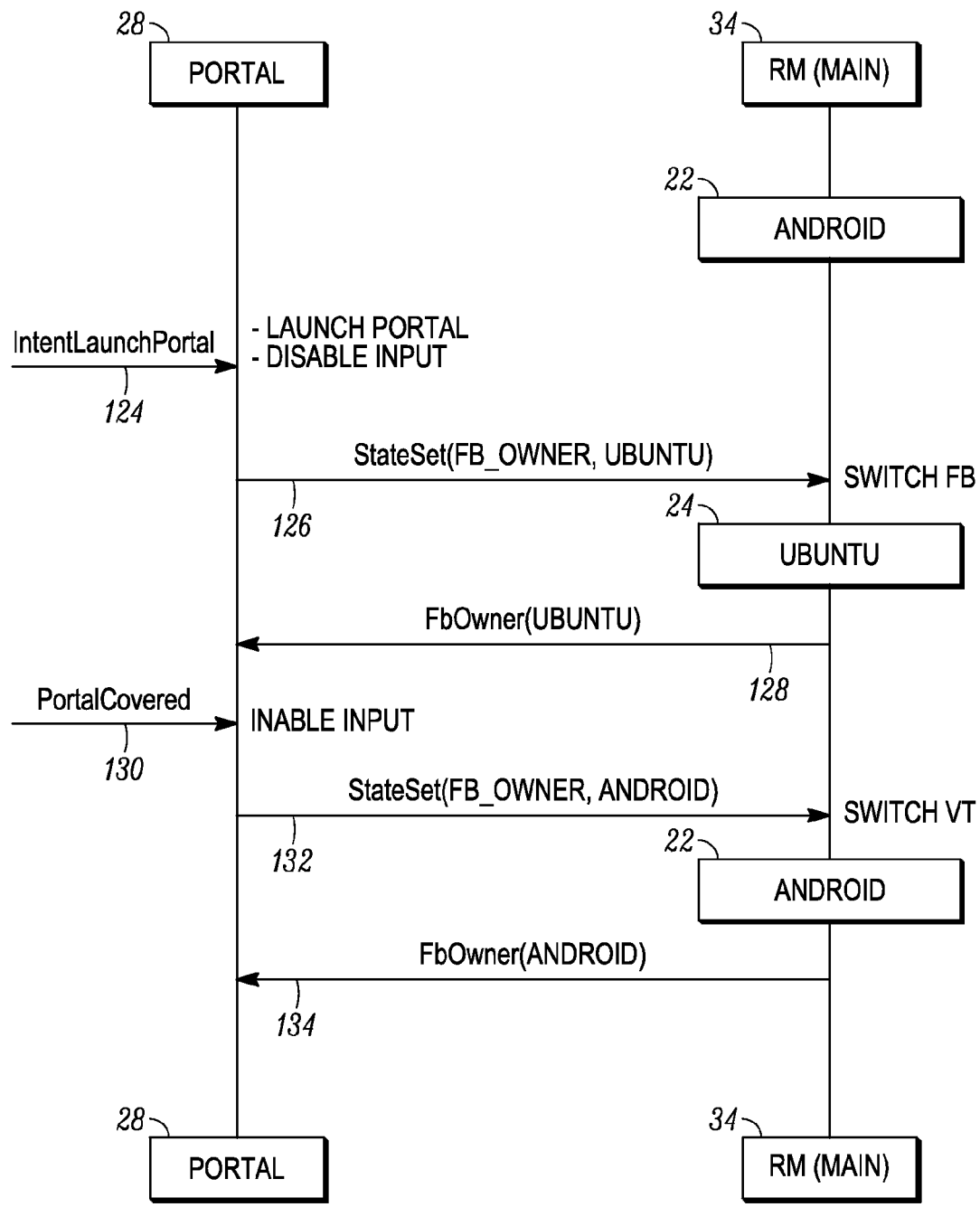
FIG. 8 is a message sequence chart identifying exemplary steps for launching a second operating environment application while a first operating environment has primary control.

Referring to FIG. 8, a message sequence chart identifying the steps for launching a second OS 24 application while the first OS 22 has primary control is provided. The sequence chart provides a step wise flow, from top to bottom, of the signals transmitted between the portal activity module 28 and the resource manager 34. The portal activity 28 receives a signal 124 to launch the portal and disable the input. The first OS 22 has primary control before signal 126 changes the mode state to the second OS 24 obtaining primary control. Signal 126 is sent from the portal activity 28 to the resource manager 34, which then generates a responsive signal 128 sent to the portal activity 28 indicating that the second OS 24 is the primary OS. Signal 130 is received by the portal activity 28 and enables the input. Signal 132 is sent from the portal activity 28 to the resource manager 34 changing the mode state of from the second OS 24 to the first OS 22. After receiving signal 132 the resource manager 34 switches the virtual terminal. The resource manager 34 then sends a status update signal 134 to the portal activity 28 indicating that the first OS 22 is primary.

Figure 9:
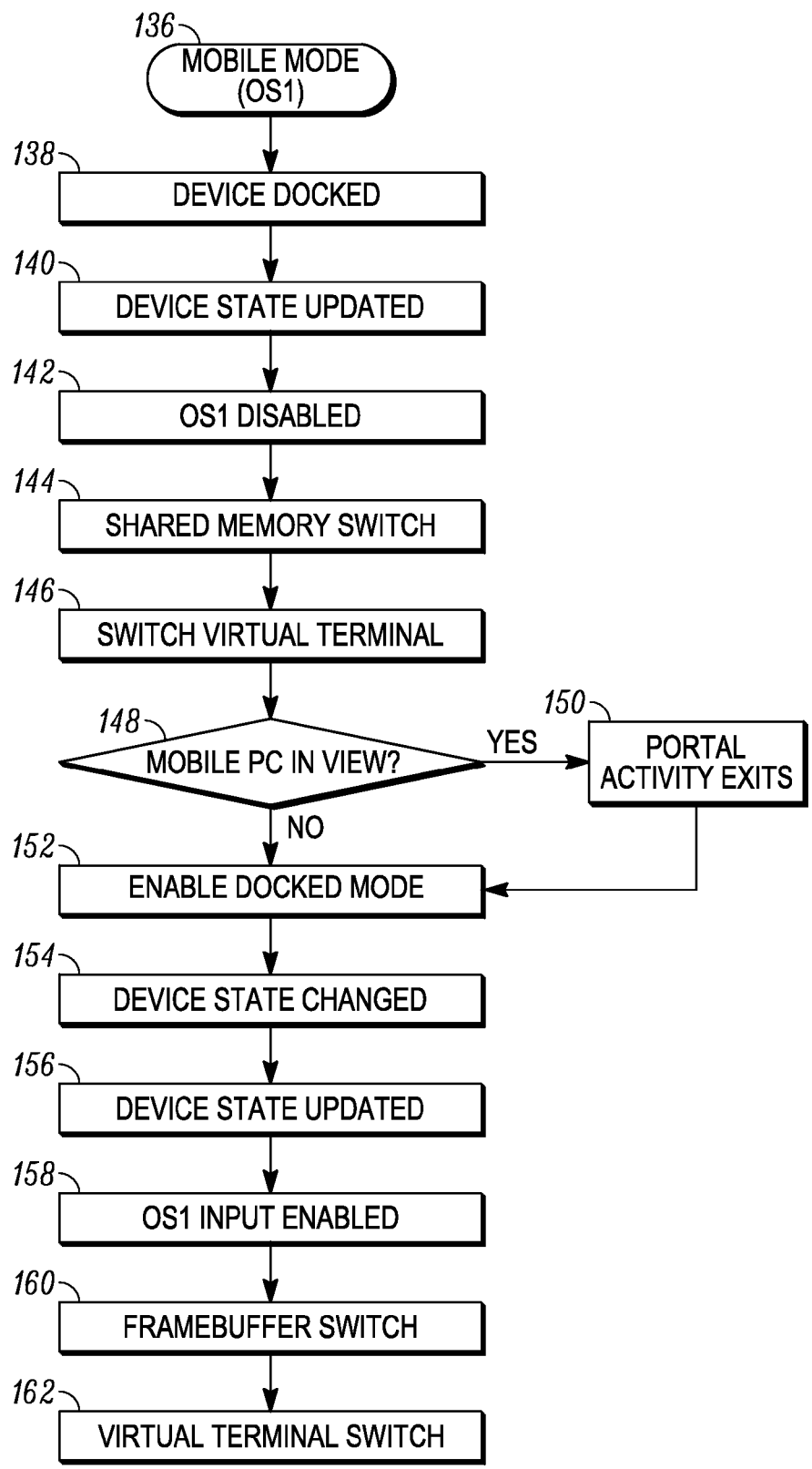
FIG. 9 is a flow chart identifying exemplary steps associated with switching from a first operating environment to a second operating environment.

Referring to FIG. 9, a flow chart identifying steps associated with switching from a first operating environment to a second operating environment is provided. The device 10 is idle in the mobile mode (OS1 22) at step 136. At step 138 the device 10 is connected to a docking station, or connected to a peripheral device. By example, an HDMI connection can be established between the device 10 and a monitor or a television. The resource manager 34 is notified of the updated connection status at step 140 and the first OS 22 is disabled at step 142 in response to the connection status change. The first OS 22 portal switches the shared memory framebuffer at step 144, followed by the resource manager 34 switching the virtual terminal at step 146. If the Mobile PC application is in view at step 148, then the portal activity 26 exits at step 150. Alternatively, if the Mobile PC application is not in view, then the docked mode is enabled at step 152. In the event that the device state changes at step 154, then the resource manager 34 receives a status state update at step 156. By example, the state of the system changes when a user removes an HDMI cable, or similar connector, which is used for connecting the device 10 to a peripheral device. Following an event state update 156, the first OS 22 is enabled 158 and the device operates in mobile mode. A framebuffer switch is requested at step 160 and a virtual terminal switch is requested at step 162, both of which are performed by the portal activity 26. Following step 162, the device reverts to an idle state in the mobile mode 136.

Figure 10:
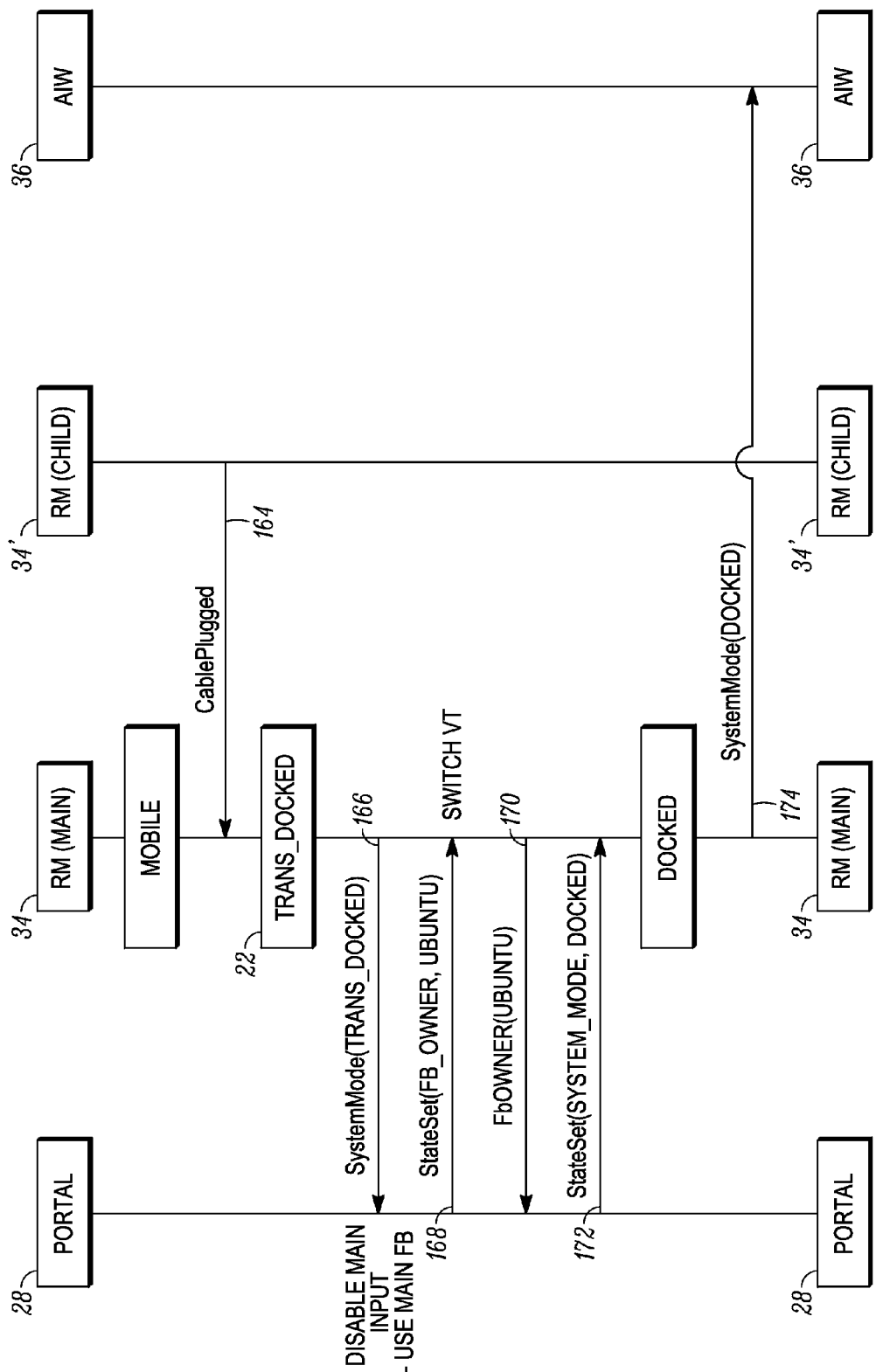
FIG. 10 is a message sequence chart identifying exemplary steps for switching from a first operating environment to a second operating environment.

Referring to FIG. 10, a message sequence chart identifying the steps performed when the device 10 transitions from mobile mode (OS1) to docked mode (OS2) is provided. The device 10 is operating in mobile mode and the first OS 22 is the primary OS. A cable signal 164 is received by the resource manager 34, which indicates that an HDMI or alternate hardwire plug has been attached to the device 10. The cable signal 164 is an exemplary mode state initialization change signal. In an alternative embodiment, the plug can be wireless communication between the device 10 and a peripheral device, and disabling the wireless communication would cause a mode state initialization change signal to be generated. A sequence of signals transitioning the device from mobile mode to docked mode is initiated. Signal 164 is sent from the resource manager 34 to the portal activity 28 indicating a mode status transition and disabling the main data input. The portal activity 28 sends signal 168 to the resource manager 34 identifying the second OS 24 is now primary and switching the virtual terminal. Signal 170 is sent from the resource manager 34 to the portal activity identifying the second OS 24 as the primary and has taken ownership of the framebuffer. A mode state change confirmation signal 172 is sent from the portal activity 28 to the resource manager 34 identifying that the device is now in docked mode and that the second OS 24 is the primary OS. A system mode update signal is sent from the resource manager 34 to AIW 36.

Figure 11:
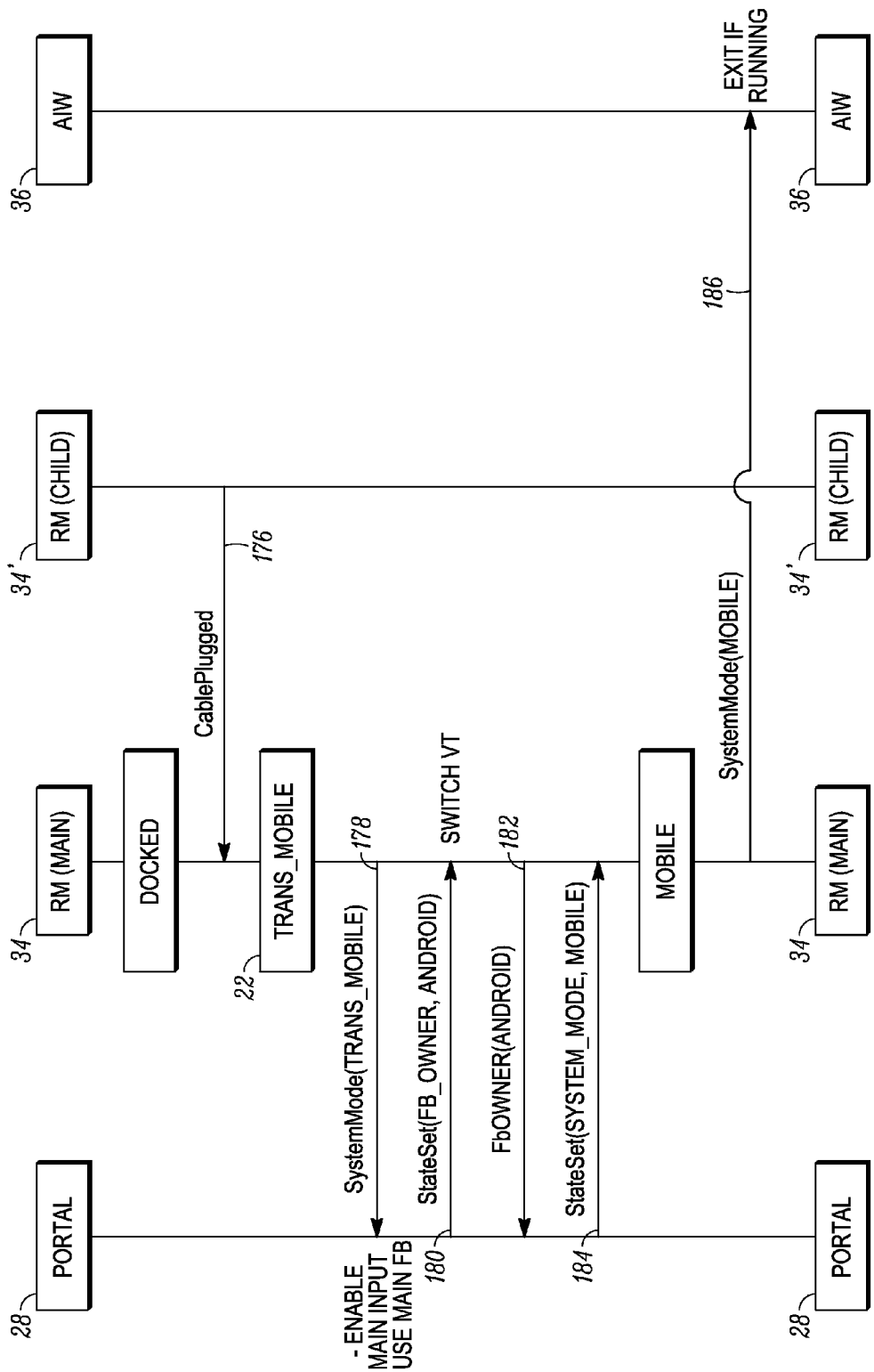
FIG. 11 is a message sequence chart identifying exemplary steps for switching from a second operating environment to a first operating environment.

Referring to FIG. 11, a message sequence chart identifying the steps performed when the device 10 transitions from docked mode (OS2) to mobile mode (OS1) is provided. A cable signal 176 is received by the resource manager 34, which indicates that an HDMI or alternate hardwire plug has been removed from the device 10. Removal of the plug indicates that a peripheral device (not shown) is no longer in communication with the device 10. In an alternative embodiment, the plug can be wireless communication between the device 10 and a peripheral or alternate device (not shown). A sequence of signals transitioning the device from docked mode to mobile mode is initiated. Signal 178 is sent from the resource manager 34 to the portal activity 28 indicating a mode status transition and enabling the main data input and the main framebuffer. The portal activity 28 sends signal 180 to the resource manager 34 identifying the first OS 22 is now primary and switching the virtual terminal. Signal 182 is sent from the resource manager 34 to the portal activity identifying the first OS 22 as the primary and has taken ownership of the framebuffer. A mode state change confirmation signal 184 is sent from the portal activity 28 to the resource manager 34 identifying that the device is now in mobile mode and that the first OS 22 is the primary OS. A system mode update signal is sent from the resource manager 34 to AIW 36.

Figure 12:
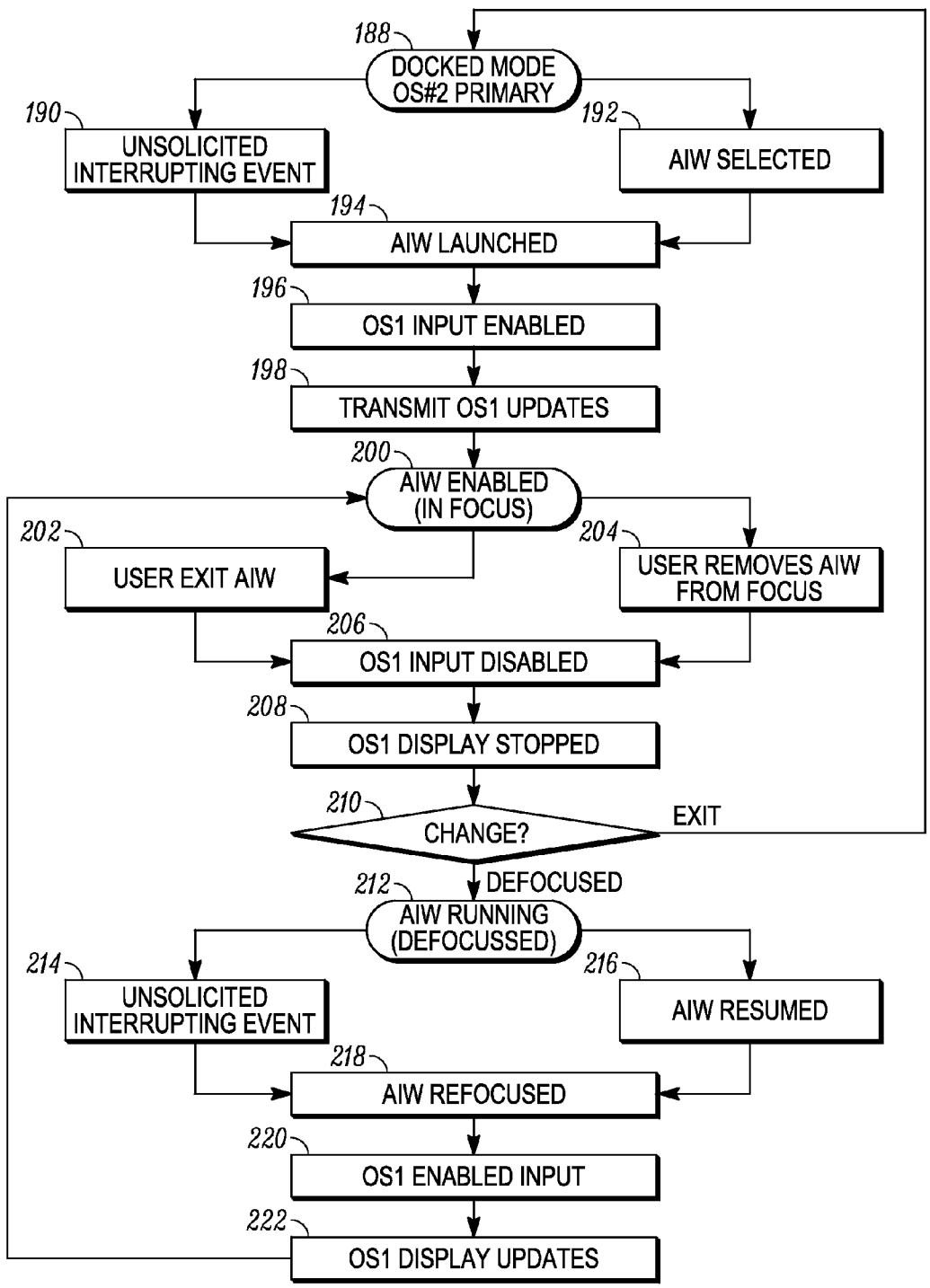
FIG. 12 is a flow chart identifying exemplary use of an application controlled by a first operating environment while a second operating environment has primary control of a computing device.

Referring to FIG. 12, the device 10 is idle in docked mode and the second OS 24 is the primary operating environment at step 188. If an unsolicited event occurs at step 190 or the user selects the OS122 in a window application at step 192, then the OS1 22 in a window application is launched at step 194. By example, if Android is the mobile operating environment 22, then the Android in a Window (AIW) application is launched. The AIW application enables a user to access Android applications while the device is operating in the docked mode. The resource manager 34 is also notified of the status update at step 194. Input to the first OS 22 is enabled at step 196, followed by the transmission of first OS display update notifications at step 198. The AIW application is operating and has focus at step 200. If the AIW application is exited at step 202 or a user removes AIW from focus at step 204, then the first OS 22 input is disabled at step 206. The first OS 22 display is stopped at step 208. If the AIW application is exited at step 210, then the system reverts to the idle docked mode 188. Alternatively, if the AIW application is defocused then the application operates in this state at step 212. In the event of an unsolicited event at step 214 or a solicited interaction with the AIW application at step 216, the AIW regains focus at step 218. While the AIW is defocused a user can select the AIW application and continue interaction with the AIW window, which refocuses the AIW and notifies the resource manager 34 of the status update. After the AIW regains focus the first OS 22, which is Android for the present embodiment, input is enabled at step 220. The first OS 22 display update notifications are transmitted to the resource manager 34 at step 222, followed by the system reverting to step 200, where AIW is enabled and in focus. When an application is in focus, that application is at the logical top of a stack of running applications.

In an alternative embodiment, it is contemplated that the device 10 can transition between mode states based upon events other than docking or undocking the device 10. By example, if the device 10 is stationary for a preset period of time the device 10 can be programmed to operate in the most energy efficient mode state, regardless of the device status otherwise. In yet another example, a user can transition the mode state from docked to mobile even if the device has a connection with a peripheral device. Additionally, the type of peripheral device connected to the device 10 can dictate whether an automatic mode state change sequence is initiated or a user is provided a mode state change request. The user thereby being able to select the mode state in which to operate the device 10. In yet another alternative embodiment, additional mode states are contemplated based upon the particular device 10 usage and the applications available in the device memory 20.

It is specifically intended that the present invention not be limited to the embodiments and illustrations contained herein, but include modified forms of those embodiments including portions of the embodiments and combinations of elements of different embodiments as come within the scope of the following claims.

The invention claimed is:

1. A method for booting a device having at least two co-existing independent operating system environments comprising the following steps:
   initiating a start-up boot sequence;
   initializing a core kernel;
   identifying a device mode state;
   launching services common to a first operating system environment and a second operating system environment, wherein the first and second operating system environments do not exist in a virtualization or emulation scheme but rather operate on the core kernel;
   selecting a primary operating system environment from among the first and second operating system environments based at least in part upon the mode state;
   launching initializing scripts of the primary operating system environment; and
   launching initializing scripts of a secondary operating system environment.

2. The method according to claim 1, wherein the device boots both operating system environments in a start-up boot sequence, the second operating system environment being the primary operating system environment when the mode state is personal computing.

3. The method according to claim 1, wherein the device boots the at least two operating system environments in a start-up sequence, the first operating system environment booting first when the mode state is identified as a mobile mode.

4. A method for initializing an operating system, comprising the following steps:
   initializing a boot sequence;
   selecting at least two operating system environments for operating a mobile device, wherein the at least two operating system environments are configured to be independent and co-exist while the device is operational;
   launching a common kernel, wherein the at least two operating system environments do not exist in a virtualization or emulation scheme but rather operate on the common kernel;
   launching application services common to a first operating system environment and a second operating system environment of the at least two operating system environments;
   selecting a primary and a secondary operating system environment based at least in part upon a mode state of the device; and
   simultaneously launching initializing scripts for the primary and secondary operating system environments.

5. The method according to claim 4, wherein the first operating system environment is the primary environment.

6. The method according to claim 4, wherein the second operating system environment is the primary environment.

7. The method according to claim 6, wherein the mode state is a mobile mode.

8. The method according to claim 4, further comprising the step of initiating a secondary operating system application.

9. The method according to claim 4, wherein the secondary environment is a mobile environment.

10. A method of operating a device having at least two operating system environments, the method comprising:
    operating the at least two operating system environments on a common kernel;

wherein the operating system environments do not exist in a virtualization or emulation scheme.

11. The method of claim 10, wherein the at least two operating system environments include a first operating system environment and a second operating system environment.

12. The method of claim 11, further comprising:
launching services common to the first operating system environment and the second operating system environment.

13. The method of claim 12, wherein one of the first and second operating system environments is a primary operating system environment and another of the first and second operating system environments is a secondary operating system environment.

14. The method of claim 13, wherein whether the first operating system environment or the second operating system environment is the primary operating system environment depends at least in part upon a mode state of the device.

15. The method of claim 14, wherein if the mode state of the device is a docked mode, then the primary operating system environment is the second operating system environment, and wherein if the mode state of the device is a mobile mode, then the primary operating system environment is the first operating system environment.

16. The method of claim 15, wherein primary environment-specific services are launched before secondary environment-specific services.

17. The method of claim 16, wherein the launching of the services common to the first and second operating system environments occurs in a manner that is separate from a launching of at least some of the primary and secondary environment-specific services.

18. The method of claim 15, wherein when the device is in the docked mode and a peripheral device is unplugged, there is an automatic switch to the mobile mode such that the primary operating system environment becomes the secondary operating system environment and vice-versa.

19. The method of claim 14, wherein the device is a mobile device.

20. The method of claim 12, wherein the at least two operating system environments are co-existing and independent.

* * * * *